United States Patent
Norrell

(10) Patent No.: US 7,023,910 B1
(45) Date of Patent: Apr. 4, 2006

(54) DUAL-LINE DSL SYSTEM AND METHOD

(75) Inventor: Andrew L. Norrell, Nevada City, CA (US)

(73) Assignee: 2Wire, Inc., San Jose, CA (US)

( * ) Notice: Subject to any disclaimer, the term of this patent is extended or adjusted under 35 U.S.C. 154(b) by 664 days.

(21) Appl. No.: 10/027,481

(22) Filed: Dec. 19, 2001

Related U.S. Application Data

(60) Provisional application No. 60/257,275, filed on Dec. 21, 2000.

(51) Int. Cl.
*H04B 1/38* (2006.01)

(52) U.S. Cl. .................. 375/222; 375/219; 370/201; 370/286; 708/322

(58) Field of Classification Search ............ 375/219, 375/258, 222, 257; 370/200, 286, 295, 465, 370/480, 493, 201; 708/322
See application file for complete search history.

(56) References Cited

U.S. PATENT DOCUMENTS

| | | | |
|---|---|---|---|
| 4,024,359 A | 5/1977 | DeMarco et al. | |
| 4,024,360 A | 5/1977 | Biraghi et al. | |
| 4,173,714 A | 11/1979 | Bloch et al. | |
| 4,733,389 A | 3/1988 | Puvogel | |
| 5,304,940 A | 4/1994 | Harasawa et al. | |
| 5,555,274 A | 9/1996 | Sheets | |
| 5,901,205 A * | 5/1999 | Smith et al. | 379/93.01 |
| 5,978,373 A | 11/1999 | Hoff et al. | |
| 6,147,963 A * | 11/2000 | Walker et al. | 370/200 |
| 6,295,323 B1 | 9/2001 | Gabara | |
| 6,411,657 B1 | 6/2002 | Verbin et al. | |
| 6,466,588 B1 * | 10/2002 | Michaels | 370/493 |
| 6,507,608 B1 | 1/2003 | Norrell | |
| 6,519,291 B1 * | 2/2003 | Dagdeviren et al. | 375/260 |
| 6,690,666 B1 | 2/2004 | Norrell et al. | |
| 2002/0001340 A1 * | 1/2002 | Shenoi et al. | 379/211 |
| 2002/0078247 A1 | 6/2002 | Lu et al. | |
| 2003/0091053 A1 * | 5/2003 | Tzannes et al. | 370/395.1 |

* cited by examiner

*Primary Examiner*—Temesghen Ghebretinsae
(74) *Attorney, Agent, or Firm*—Blakely, Sokoloff, Taylor & Zafman LLP

(57) ABSTRACT

A dual-line DSL system comprises a central office and a customer premises coupled by at least two communication paths that together provide a single high-bandwidth channel. An ADSL transceiver unit-remote (ATU-R) at the customer premises is configured to reduce the effects of far end cross talk and near end cross talk on signals received by the ATU-R.

22 Claims, 4 Drawing Sheets

DUAL-LINE DSL SYSTEM AND METHOD

CROSS-REFERENCE TO RELATED APPLICATIONS

This application claims the benefit of U.S. Provisional Patent Application No. 60/257,275, entitled "Dual-Line ADSL Modem," filed Dec. 21, 2000. This application is also related to U.S. patent application Ser. No. 09/791,970, entitled "Multi-Line ADSL Modulation," filed Feb. 22, 2001, which is now U.S. Pat. No. 6,507,608. The subject matter of the related applications is hereby incorporated by reference. The related applications are commonly assigned.

BACKGROUND OF THE INVENTION

1. Field of the Invention

This invention relates generally to digital subscriber line (DSL) systems and relates more particularly to a dual-line DSL system and method.

2. Description of the Background Art

Digital Subscriber Line (DSL) technology has existed for several years. There are some significant competing broadband technologies, such as cable and satellite television and wireless technologies such as mobile multipoint distribution services (MMDS) and local multipoint distribution services (LMDS). Some implementations of these competitive services may be better suited to video-on-demand services than current DSL technology, but not well suited to traditional data communications or interactive voice and video applications. For these applications, DSL may have the advantages of greater upstream bandwidth and lower latency.

Hence, there is a need to improve DSL technology data rates so as to potentially deliver services such as video-on-demand in an effective manner. DSL service providers, therefore, generally need to increase the downstream data rate by about a factor of two to provide video-on-demand services to a large percentage of their customers. The service providers would prefer to increase the downstream data rate without running new copper wires from central offices to customer premises, which would likely be cost prohibitive.

The performance of a DSL system may be affected by several factors, including but not limited to, cable attenuation, Gaussian noise, near end cross talk, far end cross talk, impulse noise, and dispersion. Techniques for improving DSL data rates should address some of these limitations on DSL system performance.

SUMMARY OF THE INVENTION

The dual-line DSL system of the invention includes a central office and a customer premises coupled by two communication paths. In one embodiment, the communication paths are twisted-pair copper wires. The two communication paths provide a single high-bandwidth communication channel between the central office and the customer premises, which allows the central office to effectively transmit high-bandwidth signals such as video-on-demand to the customer premises without upgrading the existing loop plant.

In one embodiment, one data stream is inversely multiplexed at the asynchronous transfer mode (ATM) layer by a DSLAM at the central office to provide two signals. An ADSL transceiver unit-remote (ATU-R) at the customer premises receives the two signals and multiplexes them at the ATM layer to recreate the original data stream. The ATU-R of the invention is configured to reduce the effects of far end cross talk and near end cross talk on the signals received from the central office.

DETAILED DESCRIPTION OF THE DRAWINGS

Figure 1:
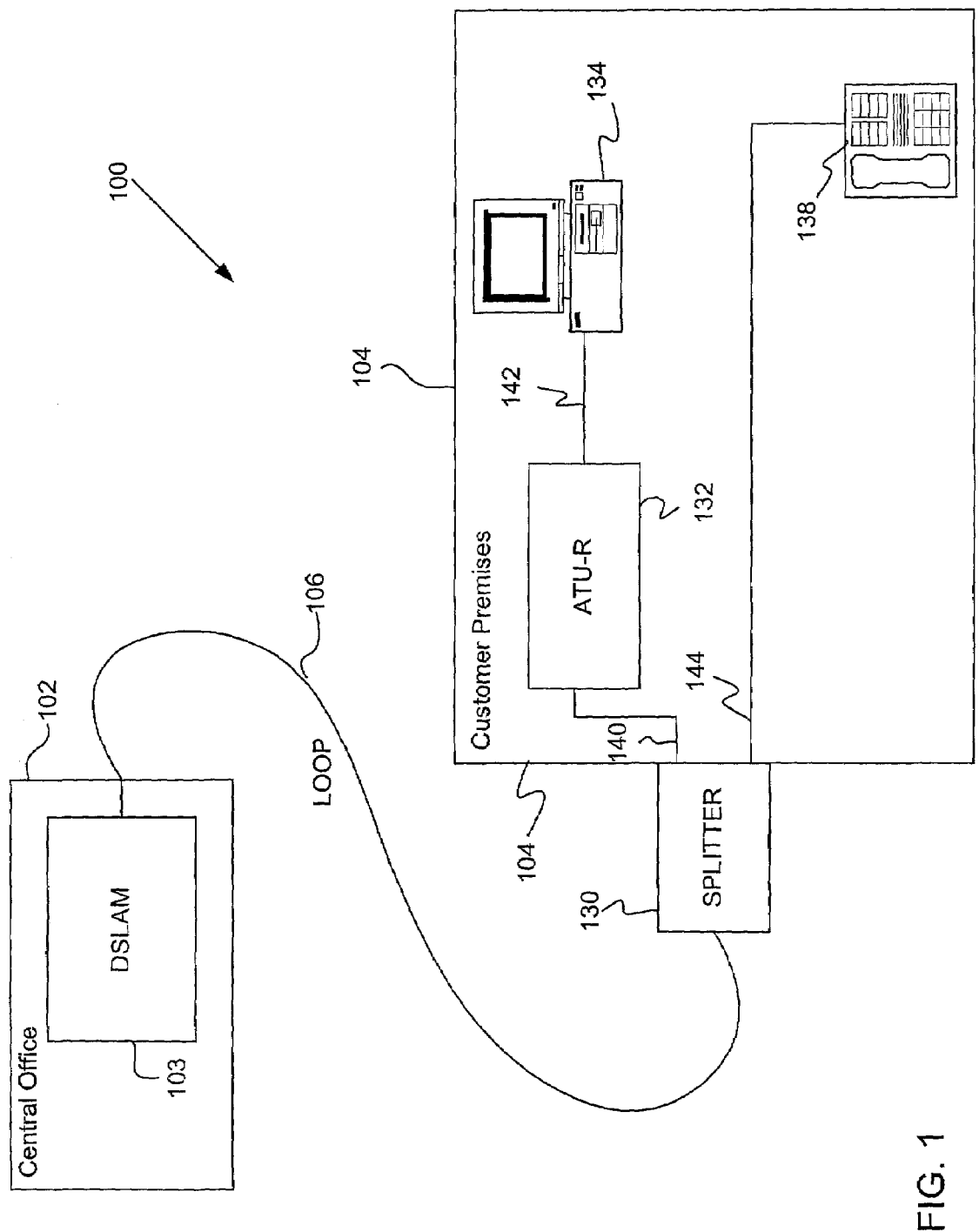
FIG. 1 is a block diagram of one embodiment of an electronic network system.

FIG. 1 is a block diagram of one embodiment of an electronic network system 100 including a central office 102, a loop 106, and a customer premises 104. Central office 102 includes, but is not limited to, a Digital Subscriber Line Access Multiplexer (DSLAM) 103 that communicates via loop 106 with a splitter 130 attached to customer premises 104. Although splitter 130 is shown outside of customer premises 104, splitter 130 may alternatively be located inside customer premises 104. DSLAM 103 sends and receives DSL signals, such as ADSL signals, and Plain Old Telephone Service (POTS) signals via loop 106, which is embodied as a twisted-pair copper wire.

Customer premises 104 includes, but is not limited to, an ADSL Transceiver Unit-Remote (ATU-R) 132 (also sometimes called an ADSL modem), a personal computer (PC) 134, and a telephone 138. Splitter 130 splits the signals from loop 106, sending the DSL signals via path 140 to ATU-R 132 and the POTS signals via path 144 to telephone 138. ATU-R 132 processes the DSL signals and sends the resulting data, for example a web page or email message, to PC 134 via path 142. Splitter 130 also receives signals from ATU-R 132 and telephone 138, and combines the signals for transmission over loop 106. DSLAM 103 includes an Asynchronous Transfer Mode (ATM) layer for processing data sent and received via DSL signals.

Figure 2:
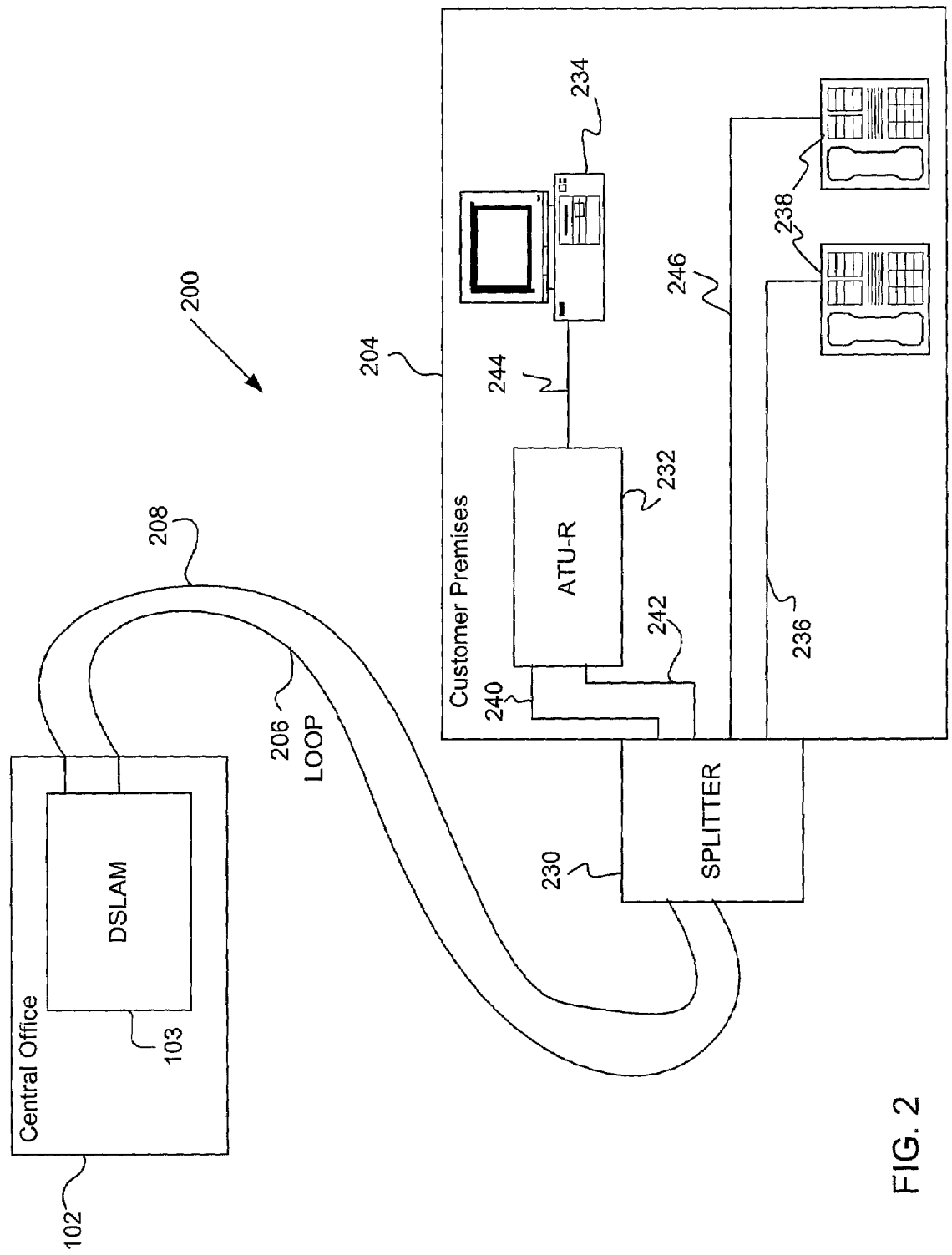
FIG. 2 is a block diagram of one embodiment of an electronic network system, in accordance with the present invention.

FIG. 2 is a block diagram of one embodiment of an electronic network system 200, in accordance with the invention. In system 200, central office 102 communicates with a customer premises 204 via two identical loops 206 and 208. Loop 206 and loop 208 communicate with separate ports of DSLAM 103 in central office 102. Loop 206 and loop 208 provide at least two communication channels between central office 102 and customer premises 204. Each loop 206, 208 is able to carry both DSL signals and POTS signals. Loop 206 and loop 208 allow central office 102 to deliver higher bandwidth data, for example video-on-demand, to customer premises 204.

Splitter 230 splits the signals on loop 206, sending DSL signals via path 242 to ATU-R 232 and POTS signals via path 236 to telephone 238. Splitter 230 also splits the signals on loop 208, sending DSL signals via path 240 to ATU-R 232 and POTS signals via path 246 to telephone 238. Although not shown in FIG. 2, other POTS devices such as facsimile machines and dial-up modems may send and receive signals via path 236 and path 246. ATU-R 232 processes DSL signals received via path 240 and 242 to produce data that is output to PC 234 via path 244, and processes data received from PC 234 to produce DSL signals that are output to path 240 and path 242.

In one embodiment, loop 206 and loop 208 are viewed as a single dual-line channel. DSLAM 103 splits downstream DSL signals destined for customer premises 204 into two data streams at the signals' ATM layer. In another embodiment, loop 206 is a fast channel for real-time traffic that requires low latency and loop 208 is an interleaved channel for data that requires lower error rates but can tolerate higher latency, such as streaming video. All other techniques for delivering data to customer premises 204 over two physical channels are within the scope of the invention.

ATU-R 232 is configured to recombine the two data streams at the ATM layer. In one embodiment, ATU-R 232 uses a multiplexer to recombine the two streams. The contents and functionality of ATU-R 232 are further discussed below in conjunction with FIG. 4.

The dual-line DSL system shown in FIG. 2 can achieve downstream data rates in excess of 10 Million bits per second (Mbps) for customer premises 204 up to about 12,000 feet from central office 102. The dual-line DSL system and method of the invention provide a competitive alternative to very high speed DSL (VDSL), which can provide data rates of about 13 Mbps but only at distances of about 4500 feet from a central office.

Figure 3:
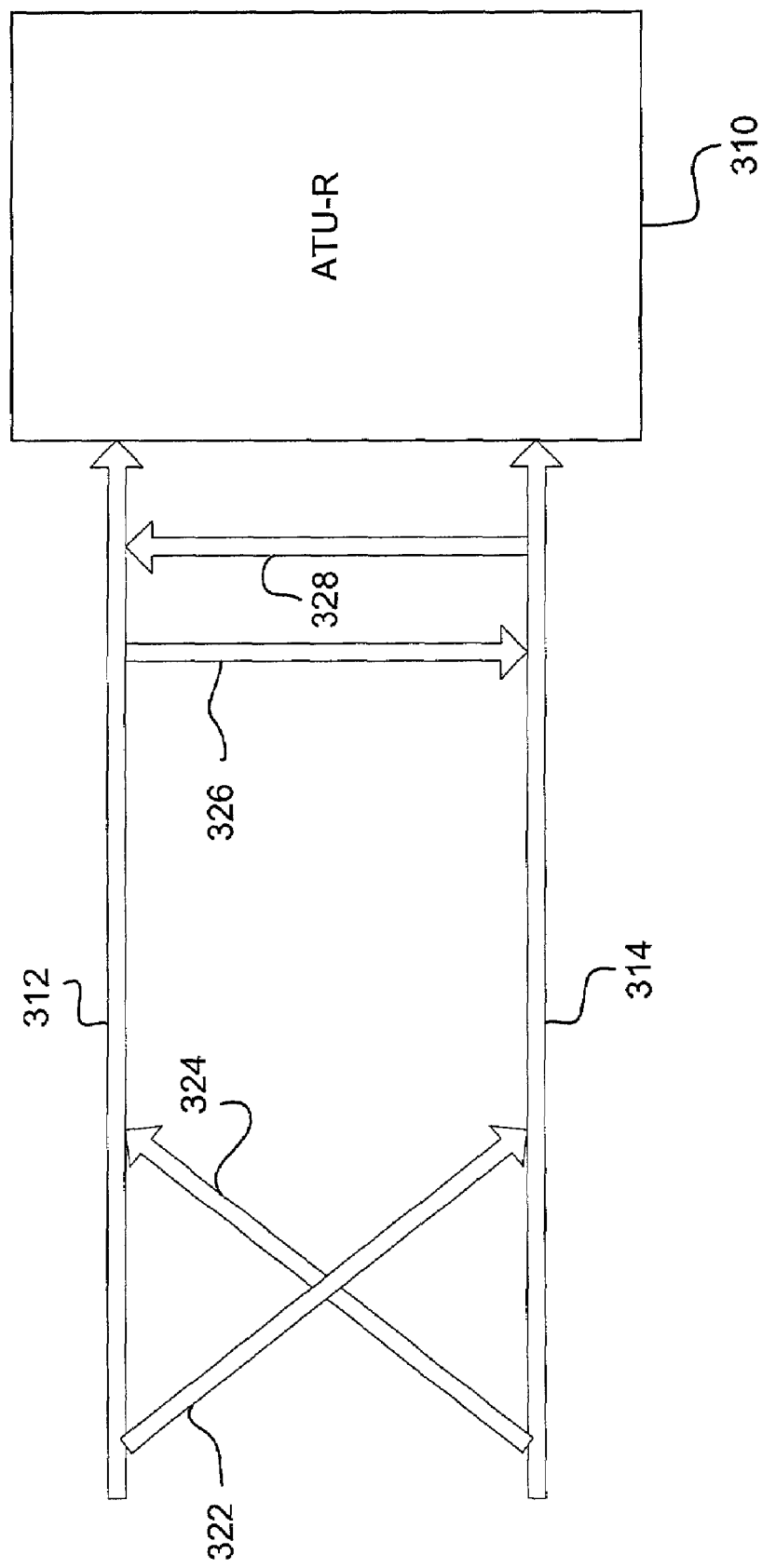
FIG. 3 is a diagram illustrating far end cross talk and near end cross talk in an electronic network system, in accordance with the invention.

FIG. 3 is a diagram illustrating far end cross talk and near end cross talk in an electronic network system, in accordance with the invention. An ATU-R 310 sends and receives data via two lines, line 312 and line 314. Each of these lines is affected by far end cross talk (FEXT) and near end cross talk (NEXT). Far end cross talk occurs when signals in one line cross over to another line at the far end (from the point of view of ATU-R 310, the far end is typically a central office). In FIG. 3, FEXT 322 is when signals sent from the far end on line 312 cross over to line 314, and FEXT 324 is when signals sent from the far end on line 314 cross over to line 312. Near end cross talk occurs when signals in one stream cross over to another stream at the near end (ATU-R 310). In FIG. 3, NEXT 326 is when signals transmitted by ATU-R 310 on line 312 cross over to line 314, and NEXT 328 is when signals transmitted by ATU-R 310 on line 314 cross over to line 312.

Wiring at a customer premises is typically not engineered to reduce cross-talk. This is particularly true when the customer premises is a home, where wiring may have been done ad-hoc without a well-planned topology. Also, the types of wire used in a customer premises may not be uniform. Cross-talk at a central office is typically not as severe due to the use of good engineering practices when designing the wiring topology.

The effect of FEXT and NEXT on each line can be represented as a transfer function. For example, through measurement and observation, a transfer function $H1(f)$ representing the effects of FEXT 322 can be determined, and a transfer function $H2(f)$ representing the effects of FEXT 324 can be determined. Transfer functions representing the effects of NEXT 326 and NEXT 328 can similarly be determined.

Since NEXT 326 and NEXT 328 stem from the same source (here ATU-R 310), the resulting NEXT interference can be cancelled by signal processing hardware of ATU-R 310 (not shown). FEXT 322 and FEXT 324 are being sent to ATU-R 310, so the signal processing hardware of ATU-R 310 can significantly reduce the effects of FEXT interference.

Figure 4:
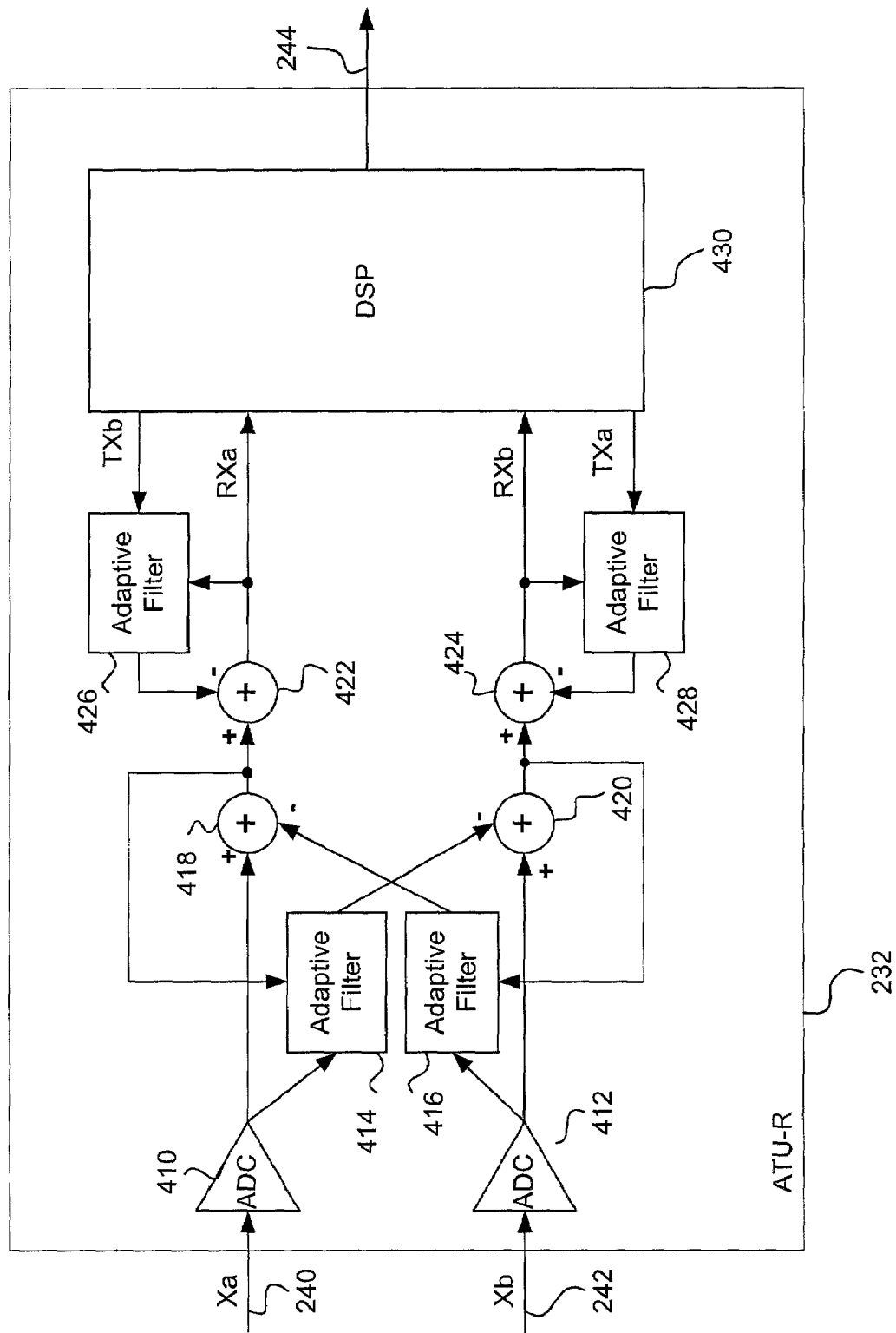
FIG. 4 is a block diagram of one embodiment of the ADSL Transceiver Unit-Remote (ATU-R) of FIG. 2, in accordance with the invention.

FIG. 4 is a block diagram of one embodiment of ATU-R 232 of FIG. 2, in accordance with the invention. ATU-R 232 includes, but is not limited to, Analog-to-Digital Converters (ADC) 410 and 412, adaptive filters 414, 416, 426, and 428, adders 418, 420, 422, and 424, and digital signal processor (DSP) 430. ATU-R 232 receives signals Xa(f) and Xb(f) from path 240 and 242, respectively. ADC 410 and ADC 412 convert these signals into digital signals. Adaptive filter 414 filters the output sample stream from ADC 410 by an adaptive filter transfer function $C_{1F}$ that is approximately equal to the transfer function that represents the effects of FEXT from path 240 to path 242. Adaptive filter 416 filters the output sample stream from ADC 412 by an adaptive filter transfer function $C_{2F}$ that is approximately equal to the transfer function that represents the effects of FEXT from path 242 to path 240. Adder 418 subtracts the output from adaptive filter 416 from the output of ADC 410, and adder 420 subtracts the output from adaptive filter 414 from the output of ADC 412, thus significantly reducing the effects of FEXT on the received signals.

Since the signals received by ATU-R 232 may be affected by signals transmitted by ATU-R 232, signals transmitted via path 240 (TXa) are also input to adaptive filter 428 and signals transmitted via path 242 (TXb) are also input to adaptive filter 426. Adaptive filter 426 filters the samples of TXb by an adaptive filter transfer function $C_{2N}$ that is approximately equal to the transfer function that represents the effects of NEXT from path 242 to path 240. Adaptive filter 428 filters the samples of TXa by an adaptive filter transfer function $C_{1N}$ that is approximately equal to the transfer function that represent the effects of NEXT from path 240 to path 242. Adder 422 subtracts the output from adaptive filter 426 from the output of adder 418 and sends the sum to DSP 430, and adder 424 subtracts the output from adaptive filter 428 from the output of adder 420 and sends the sum to DSP 430, thus removing the effects of NEXT on the received signals.

Similar techniques may be used at central office 102 to reduce the effects of cross-talk at DSLAM 103, although the effects of cross-talk are typically not significant at central office 102.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. An apparatus, comprising:
an xDigitial Subscriber Line (DSL) transceiver having two or more filters configured to reduce the effects of far end cross talk and near end cross talk on signals from a central office to a customer premises, wherein the transceiver has a first output port to couple the customer premises to the central office by a first communication path comprising a first loop, a second output port to couple the customer premises to the central office by a second communication path comprising a second loop, and the two or more filters reduce the effects of far end cross talk and near end cross talk by comparing signals from the first loop to the second loop.

2. The apparatus of claim 1, wherein the transceiver is an ADSL transceiver unit-remote (ATU-R) and the signals are ADSL signals.

3. The apparatus of claim 1, wherein the first loop and the second loop each comprise a twisted-pair of wires.

4. The apparatus of claim 1, wherein a first signal on the first loop is compared to a second signal on the second loop through adaptive filter transfer functions.

5. An apparatus comprising:
an xDigitial Subscriber Line (DSL) transceiver having two or more adaptive filters configured to reduce the effects of far end cross talk and near end cross talk on signals from a central office to a customer premises, wherein the transceiver has a first output port to couple the customer premises to the central office by a first communication path comprising a first loop, a second output port to couple the customer premises to the central office by a second communication path comprising a second loop, and the two or more adaptive filters reduce the effects of far end cross talk and near end cross talk by comparing signals from the first loop to the second loop,
a first adaptive filter configured to filter a signal received via the first communication path by a first adaptive filter function to produce a first output;
a second adaptive filter configured to filter a signal received via the second communication path by a second adaptive filter function to produce a second output;
a first adder configured to subtract the second output from the signal received via the first communication path to produce a first sum;
a second adder configured to subtract the first output from the signal received via the second communication path to produce a second sum;
a third adaptive filter configured to filter a signal transmitted on the second communication path by a third adaptive filter function to produce a third output;
a fourth adaptive filter configured to filter a signal transmitted on the first communication path by a fourth adaptive filter function to produce a fourth output;
a third adder configured to subtract the third output from the first sum to produce a third sum; and
a fourth adder configured to subtract the fourth output from the second sum to produce a fourth sum.

6. The apparatus of claim 5, wherein the first adaptive filter function is approximately equal to a transfer function that represents the effects of far end cross talk from the first communication path to the second communication path.

7. The apparatus of claim 5, wherein the second adaptive filter function is approximately equal to a transfer function that represents the effects of far end cross talk from the second communication path to the first communication path.

8. The apparatus of claim 5, wherein the third adaptive filter function is approximately equal to a transfer function that represents the effects of near end cross talk from the first communication path to the second communication path.

9. The apparatus of claim 5, wherein the fourth adaptive filter function is approximately equal to a transfer function that represents the effects of near end cross talk from the second communication path to the first communication path.

10. The apparatus of claim 5, wherein the third sum from the third adder and the fourth sum from the fourth adder are input to a digital signal processor that multiplexes the third sum and the fourth sum to produce a single received signal.

11. A method comprising the steps of:
receiving a first signal from a first communication path;
receiving a second signal from a second communication path;
filtering the first signal by a first adaptive filter function to produce a first output;
filtering the second signal by a second adaptive filter function to produce a second output;
subtracting the first output from the second signal to produce a second sum;
subtracting the second output from the first signal to produce a first sum;
filtering a first transmitted signal by a fourth adaptive filter function to produce a fourth output;
filtering a second transmitted signal by a third adaptive filter function to produce a third output;
subtracting the third output from the first sum to produce a third sum; and
subtracting the fourth output from the second sum to produce a fourth sum.

12. The method of claim 11, wherein the first adaptive filter function is approximately equal to a transfer function that represents the effects of far end cross talk from the first communication path to the second communication path.

13. The method of claim 11, wherein the second adaptive filter function is approximately equal to a transfer function that represents the effects of far end cross talk from the second communication path to the first communication path.

14. The method of claim 11, wherein the third adaptive filter function is approximately equal to a transfer function that represents the effects of near end cross talk from the first communication path to the second communication path.

15. The method of claim 11, wherein the fourth adaptive filter function is approximately equal to a transfer function that represents the effects of near end cross talk from the second communication path to the first communication path.

16. The method of claim 11, further comprising the step of multiplexing the third sum and the fourth sum to produce a single received signal.

17. A transceiver comprising:
means for receiving a first signal from a first communication path;
means for receiving a second signal from a second communication path;
means for filtering the first signal by a first adaptive filter function to produce a first output;
means for filtering the second signal by a second adaptive filter function to produce a second output;
means for subtracting the first output from the second signal to produce a second sum;
means for subtracting the second output from the first signal to produce a first sum;
means for filtering a first transmitted signal by a fourth adaptive filter function to produce a fourth output;
means for filtering a second transmitted signal by a third adaptive filter function to produce a third output;
means for subtracting the third output from the first sum to produce a third sum; and
means for subtracting the fourth output from the second sum to produce a fourth sum.

18. The transceiver of claim 17, wherein the first adaptive filter function is approximately equal to a transfer function that represents the effects of far end cross talk from the first communication path to the second communication path.

19. The transceiver of claim 17, wherein the second adaptive filter function is approximately equal to a transfer function that represents the effects of far end cross talk from the second communication path to the first communication path.

20. The transceiver of claim 17, wherein the third adaptive filter function is approximately equal to a transfer function that represents the effects of near end cross talk from the first communication path to the second communication path.

21. The transceiver of claim 17, wherein the fourth adaptive filter function is approximately equal to a transfer function that represents the effects of near end cross talk from the second communication path to the first communication path.

22. The transceiver of claim 17, further comprising the step of multiplexing the third sum and the fourth sum to produce a single received signal.

* * * * *